(12) United States Patent
Brower et al.

(10) Patent No.: US 7,792,977 B1
(45) Date of Patent: Sep. 7, 2010

(54) METHOD FOR FENCING SHARED RESOURCES FROM CLUSTER NODES

(75) Inventors: David Brower, Alamo, CA (US); John Leys, Hayward, CA (US); Gary Young, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1996 days.

(21) Appl. No.: 09/797,228

(22) Filed: Feb. 28, 2001

(51) Int. Cl.
*G06F 15/16* (2006.01)
*G06F 17/00* (2006.01)
(52) U.S. Cl. .................................. 709/229; 726/27
(58) Field of Classification Search ............... 709/225, 709/229; 710/200; 713/200
See application file for complete search history.

(56) References Cited

U.S. PATENT DOCUMENTS

| | | | |
|---|---|---|---|
| 5,560,008 A * | 9/1996 | Johnson et al. ............. 713/201 |
| 5,596,754 A * | 1/1997 | Lomet ......................... 710/200 |
| 5,828,889 A * | 10/1998 | Moiin et al. ................. 710/240 |
| 5,996,075 A * | 11/1999 | Matena ........................ 713/200 |
| 5,999,712 A * | 12/1999 | Moiin et al. ................. 709/220 |
| 6,192,443 B1 * | 2/2001 | Mendel ......................... 711/1 |
| 6,192,483 B1 * | 2/2001 | Moiin et al. ................... 714/4 |
| 6,205,510 B1 * | 3/2001 | Mendel ......................... 711/1 |
| 6,226,752 B1 * | 5/2001 | Gupta et al. ................. 713/201 |
| 6,243,814 B1 * | 6/2001 | Matena ........................ 713/200 |
| 6,311,217 B1 * | 10/2001 | Ehlinger et al. ............. 709/226 |
| 6,363,495 B1 * | 3/2002 | MacKenzie et al. ........... 714/4 |
| 6,438,705 B1 * | 8/2002 | Chao et al. ..................... 714/4 |
| 6,449,641 B1 * | 9/2002 | Moiin et al. ................. 709/220 |
| 6,708,175 B2 * | 3/2004 | Curran et al. ................. 707/10 |
| 2002/0016845 A1 * | 2/2002 | Palmer et al. ............... 709/229 |

* cited by examiner

*Primary Examiner*—Aaron Strange
(74) *Attorney, Agent, or Firm*—Hickman Palermo Truong & Becker LLP

(57) ABSTRACT

Techniques are provided for managing access to resources that are shared by a cluster of nodes. One aspect of the invention is to require verification that a quorum is a valid quorum prior to enforcing the access rights specified by a node that is a member of the group of nodes holding the quorum. Further, the verification that a quorum is a valid quorum prior to enforcing access rights occurs only if the quorum associated with the specified access rights is suspected to be invalid.

30 Claims, 8 Drawing Sheets

United States Patent US 7,792,977 B1

METHOD FOR FENCING SHARED RESOURCES FROM CLUSTER NODES

FIELD OF THE INVENTION

The present invention relates to computer systems and, more particularly, to techniques for managing access to a shared resource.

BACKGROUND OF THE INVENTION

In a computer system that is configured as a cluster of cooperating computers, the resources in the computer system are shared by the computers that are members of the cluster. For example, a computer system may consist of a cluster of several computer nodes that are communicatively coupled to one another. In addition, the computer nodes may be connected to a "resource network" that includes shared resource devices such as a shared-SCSI disk driver, Storage Area Network (SAN) attached storage, Server Message Block (SMB) attached storage, etc.

Membership in the cluster does not automatically entitle a computer node to shared access of the shared resources. Rather, one technique is to allow only the computer nodes that are members of a "quorum group" of nodes share the shared resources. When a computer node breaks away from a quorum group, access to the shared resources are cut off from the break-away computer node. The cutting-off of access to the shared resource from break-away computer nodes is herein referred to as "fencing" the shared resource. Current solutions for fencing interactions between computer nodes in a cluster are tightly coupled to requirements that are specific to the I/O system of the computer system. Thus, there are no general solutions for fencing shared resources.

Based on the foregoing, there is a clear need for a general solution for managing access to a shared resource in a computer system that is configured as a cluster of nodes.

SUMMARY OF THE INVENTION

Techniques are provided for managing access to resources that are shared by a cluster of nodes. One aspect of the invention is to require verification that a quorum is a valid quorum prior to enforcing the access rights specified by a node that is a member of the group of nodes holding the quorum. In one embodiment, the operation to verify that a quorum is a valid quorum prior to enforcing access rights is performed only if the quorum associated with the specified access rights is suspected to be invalid. The determination that the validity of a quorum is suspect depends on whether any one of a set of conditions are satisfied.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are provided for managing access to a resource. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional and Operational Overview

Figure 1A:
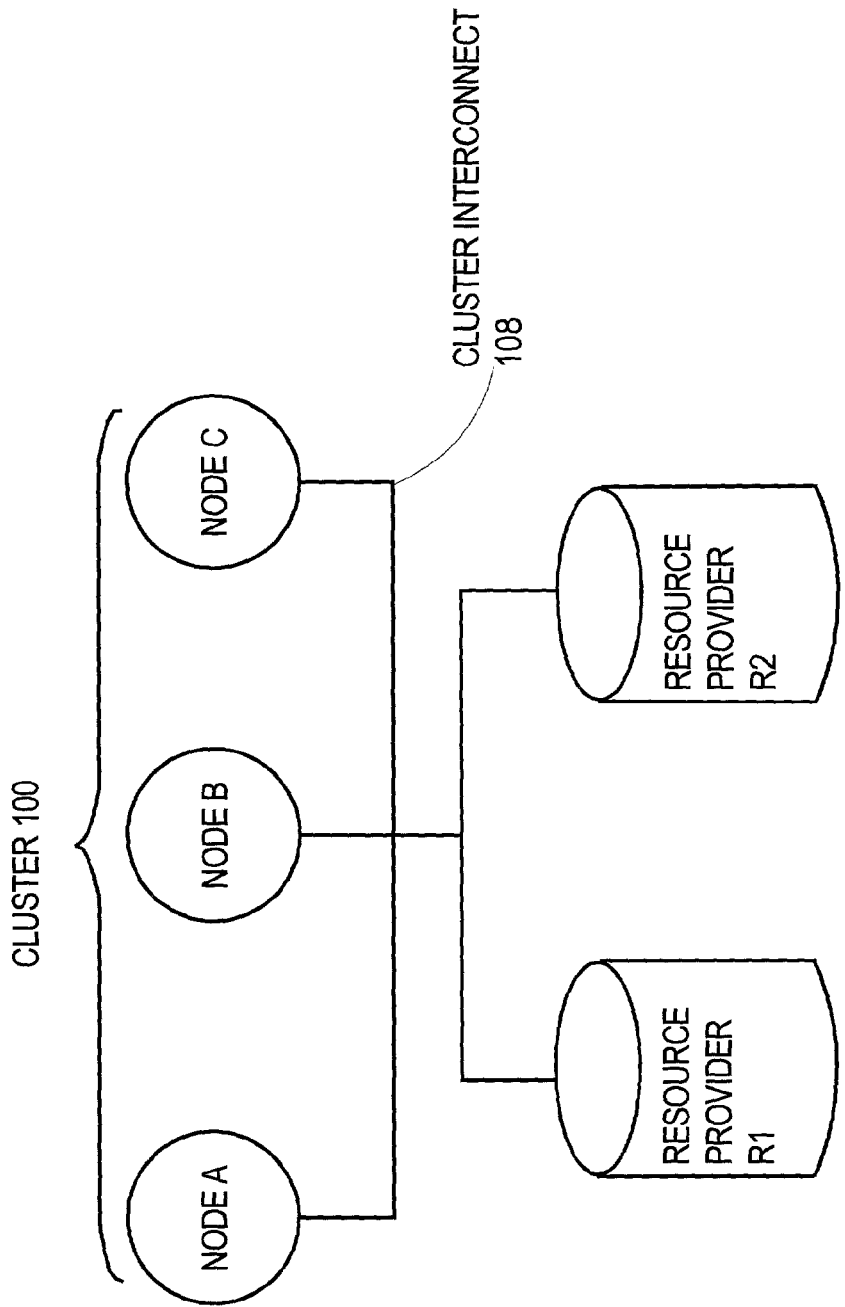
FIG. 1A is a block diagram that illustrates a cluster of nodes that are connected to a network of resources.
Figure 1B:
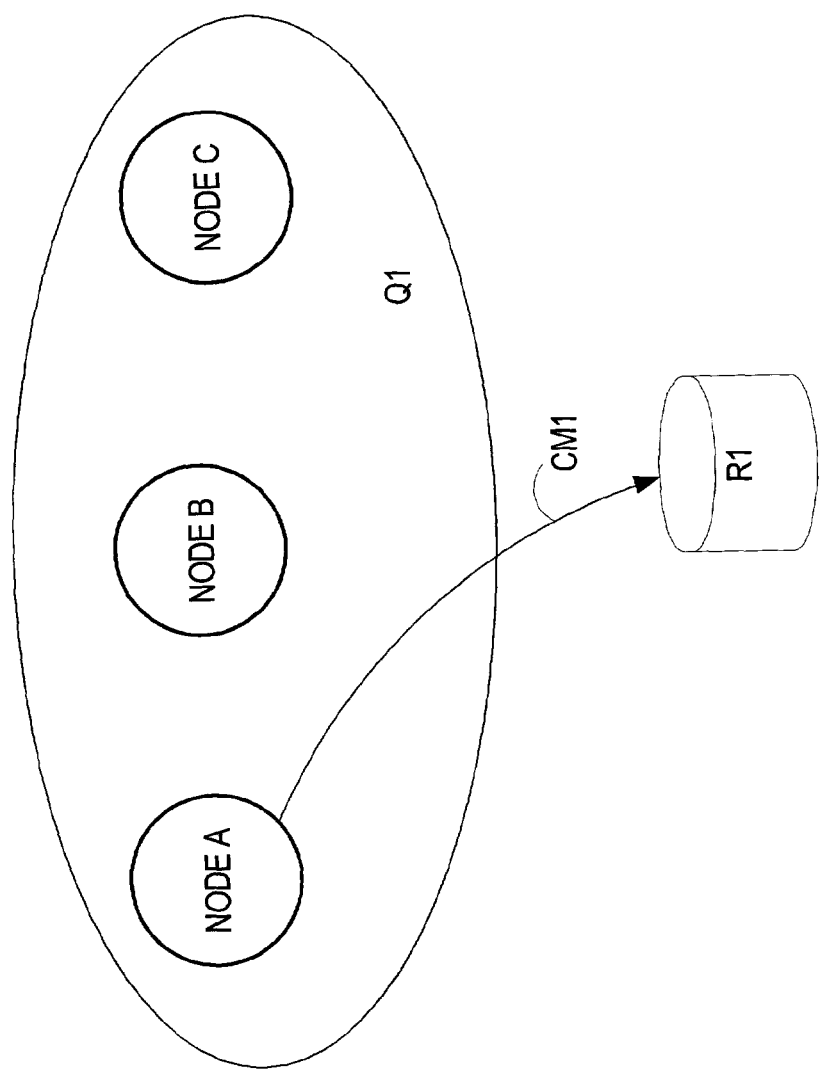
FIG. 1B is a block diagram that illustrates all the nodes in the cluster holding a quorum.
Figure 1C:
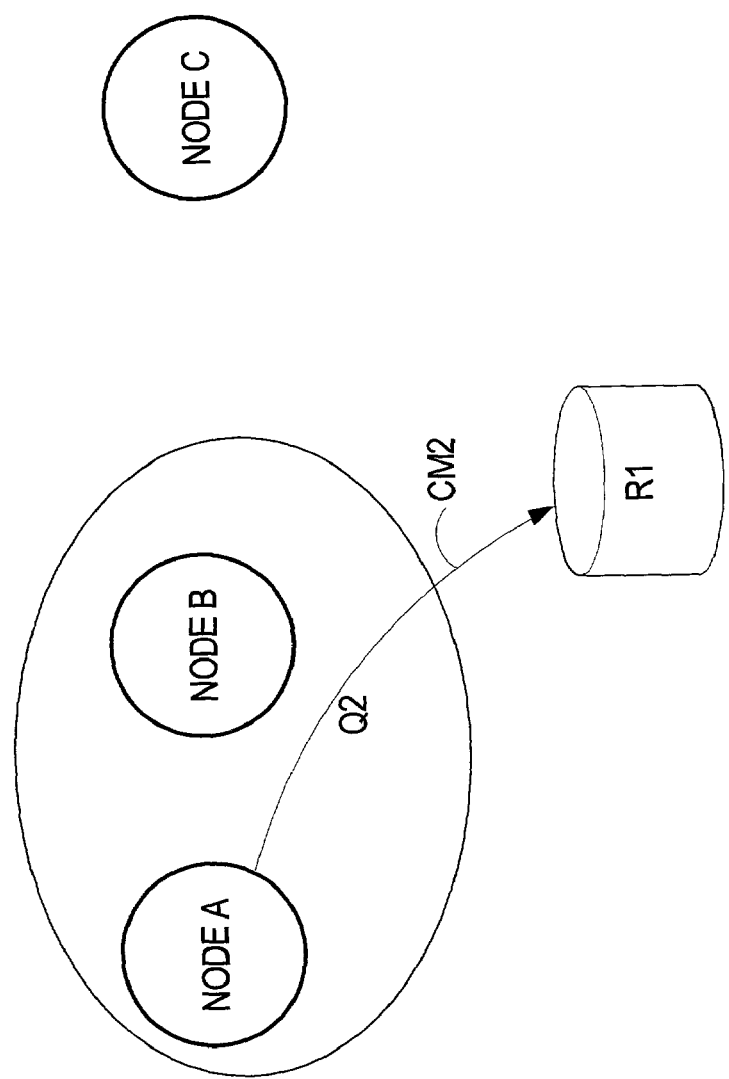
FIG. 1C is a block diagram that illustrates that not all nodes in the cluster hold a quorum.

The functional and operational overview of one embodiment of the invention is explained in conjunction with FIGS. 1A, 1B and 1C. FIG. 1A is a block diagram that illustrates a cluster of nodes, where the nodes are connected to a network of resources. Cluster 100 in FIG. 1A comprises node A, node B, and node C. By way of example, three nodes are shown. In a practical system, however, there may be several dozens of nodes in a given cluster. Cluster 100 is communicatively coupled by cluster interconnect 108 to a network of resources comprising one or more resource providers R1, and R2. Each resource provider is a computer that controls one or more storage resources (not shown in FIG. 1A). Only two resource providers are shown by way of example. In other implementations, the network of resources may comprise numerous resource providers.

FIG. 1B is a block diagram that illustrates all the nodes in the cluster holding a quorum. Node A, node B and node C form a quorum Q1 with respect to resource R1. An event at which a group of nodes agree to collectively manage access to one or more resources is hereafter referred to as a Quorum. A group of nodes that participate in a given quorum in the cluster is hereinafter referred to as a "quorum group". The mechanism by which the members of a quorum group may collectively manage access to resources that are shared by the members of the quorum group is hereafter referred to as a Quorum Group Service ("QGS"). Thus, by holding a quorum Q1, node A, node B and node C become a quorum group and together may determine their respective access rights to resource provider R1. For example, node A may send to resource provider R1, a command CM1 on behalf of the quorum group that holds quorum Q1. To illustrate, by issuing Command CM1, the quorum group that holds quorum Q1 may tell resource provider R1 to allow access to the members of the quorum group. Command CM1 may have the following form:

Allow (node A, node B, node C), Q1

Command CM1 sent by node A contains the quorum generation number Q1 identifying node A's quorum group. Different groups in the cluster may hold separate quorums and a quorum generation number is generated for each quorum. The syntax used in the preceding statement is merely illustrative. The actual syntax of statements involving commands from a quorum group member on behalf of the QGS to resource providers may vary from implementation to implementation. The present invention is not limited to any particular syntax. A command issued by a quorum group member on behalf of the QGS to a resource provider is hereinafter referred to as a "service-command".

In response to service-command CM1, resource provider R1 may issue a command to node A in order to challenge the validity of service-command CM1 that was issued by node A on behalf of the QGS. A command issued by a resource provider for the purpose of challenging the validity of the service-command that is received by the resource provider is hereinafter referred to as a "challenge-command". According to one embodiment, a resource provider will issue a challenge-command if the resource provider suspects that the source of the service-command does not belong to a valid quorum group. In certain embodiments, a resource provider will suspect that the source of the service-command does not belong to a valid quorum group if any one of the following conditions are satisfied:

1) The resource provider receives a service-command identified by a particular quorum generation number but the resource provider has no memory of a previous quorum generation number against which to compare the particular quorum generation number identifying the service-command. This condition is hereinafter referred to as a "cold boot condition";

2) The resource provider receives a service-command identified by a particular quorum generation number represents a time earlier than the time represented by a quorum generation number previously received by the resource provider. This condition is hereinafter referred to as a "competing quorums condition";

3) The resource provider receives a service-command identified by a particular quorum generation number that is identical to a previous quorum generation number in the memory of the resource provider, which previous quorum generation number is associated with a quorum group that is distinct from source of the service-command. This condition is hereinafter referred to as an "identical quorum generation numbers condition" or "split-brain condition".

FIG. 1C is a block diagram that illustrates that not all nodes in the cluster hold a quorum. For example, the membership of the quorum group of FIG. 1B may change to exclude node C from the quorum group. Thus, as shown in FIG. 1C, node A and node B form a new quorum group that holds quorum generation number Q2. Now that node C is excluded from the new quorum group, node A, on behalf of the QGS of the new quorum group, sends service-command CM2 to resource provider R1 to deny node C of access to resource provider R1. Service-command CM2 may have the following form:

Deny (node C), Q2

Quorum Generation

In certain embodiments of the invention, each QGS in the cluster has an associated quorum generation number. Any communications from any QGS to a resource provider is identified by the quorum generation number that is assigned to the QGS. In certain embodiments of the invention, a quorum generation number is an ever-increasing positive integer value that is increased each time a new QGS is created. When the membership in a QGS is changed and confirmed, the QGS is considered a new QGS. When a resource provider receives a service-command, the resource provider is able to identify the source of the service-command by the quorum generation number attached to the service-command. The resource provider then compares the quorum generation number that is attached to the service-command to the most recent quorum generation number that is stored in the resource provider's memory. If the quorum generation number that is attached to the service-command is greater than the most recent quorum generation number that is stored in the resource provider's memory, then the resource provider will usually accept the service-command without challenging the authority of the source of the service-command. Otherwise, the resource provider will challenge the authority of the source of the service-command. In certain embodiments, a resource provider will challenge the authority of the source of the service-command by issuing a challenge-command to the source in the manner explained in greater detail below.

Agents for Managing Access to Resource Providers

A variety of mechanisms may be used to facilitate communication between members of a quorum group and resource providers, including but not limited to computer-implemented software agents. Thus, software agents are used for communicating commands between a QGS and any given resource provider. Software agents are employed to perform communication functions when a given resource provider does not have an indigenous ability to communicate with members of the quorum group. For example, the resource provider may be a storage medium that is attached to a computer that may be accessed via a network using a Network File System (NFS) operating system. The agent of the computer to which the resource provider is attached may be employed to communicate with members of the quorum group as well as allow or terminate access paths to the resource provider based on quorum validity. In certain embodiments, the software agent mediates all access to the resource provider to ensure integrity.

In FIG. 1B and FIG. 1C, the commands sent from node A to resource provider R1 may be performed by a software agent that is able to communicate with the software that directly manages access to the resource provider. Similarly, a software agent may be used to communicate commands from the resource provider to a QGS.

Cold Boot of Resource Provider

Figure 2:
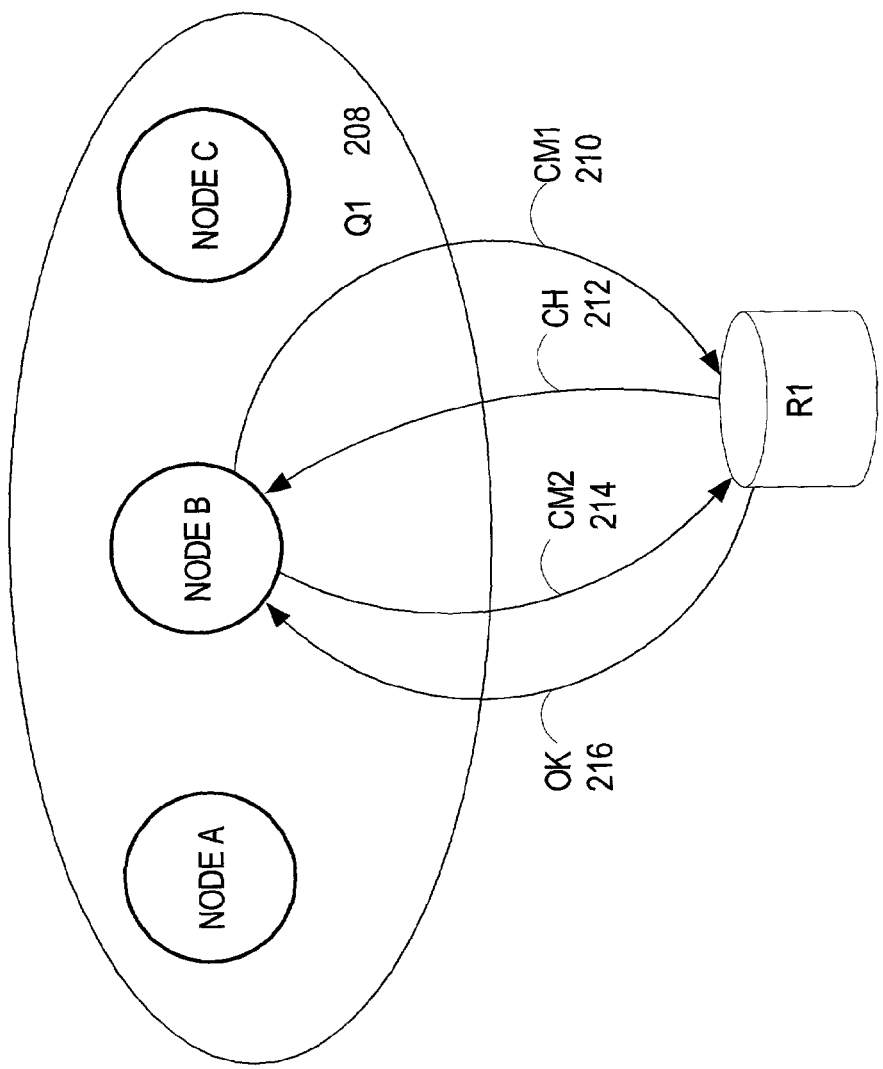
FIG. 2 is a block diagram that illustrates the condition when a resource provider has no memory of a previous quorum generation number.

FIG. 2 is a block diagram that illustrates the condition when a resource provider has no memory of a previous quorum generation number. FIG. 2 comprises a computer system 200 that consists of a cluster of nodes holding quorum identified by quorum generation number Q1. The cluster of nodes comprises node A, node B and node C. Assume that the cluster of nodes is communicatively coupled to resource provider R1.

Assume that resource provider R1 is the first resource in the computer system 200 to complete booting. In certain embodiments of the invention, resource provider R1 may be configured to initially give all nodes that are communicatively coupled to R1 "Read access". At the time that resource provider R1 completes booting, resource provider R1 has no knowledge of any quorum groups or of any quorum generation numbers. Further assume that node A, node B and node C boot and form a quorum group that holds a quorum identified by quorum generation number Q1; this quorum generation may be performed either before or after R1 completes booting.

For the purpose of illustration, the condition when resource provider R1 has no memory of a previous quorum generation number may be described by the following phases in conjunction with FIG. 2:

Phase 1: Node B, on behalf of the QGS of the quorum group that holds the quorum identified by quorum generation number Q1, sends a service-command CM1 to resource provider R1. Service-command CM1 is "Allow (node A, node B, node C), Q1".

Phase 2: Because resource provider R1 has no memory of a previous quorum generation number against which to compare Q1, which is the quorum generation number associated with service-command CM1, resource provider R1 sends a challenge-command CH to node B.

Phase 3: In response to challenge-command CH, node B determines whether the quorum group of which node B is a member holds a valid quorum. In certain embodiments of the invention, node B determines the validity of the quorum of node B's quorum group by communicating with a quorum manager (not shown in FIG. 2). After node B determines the validity of the quorum, node B sends to resource provider R1, another service-command CM2 by which node B informs resource provider R1 of the validity status of the quorum of node B's quorum group.

Phase 4: If service-command CM2 confirms the validity of the quorum of node B's quorum group, then resource provider R1 sends to node B a service-command OK to confirm that node B's original service-command CM1 is accepted. In contrast, if service-command CM2 does not confirm the validity of the quorum of node B's quorum group, then resource provider R1 will send to node B an error status (not shown in FIG. 2).

Competing Quorums

Figure 3:
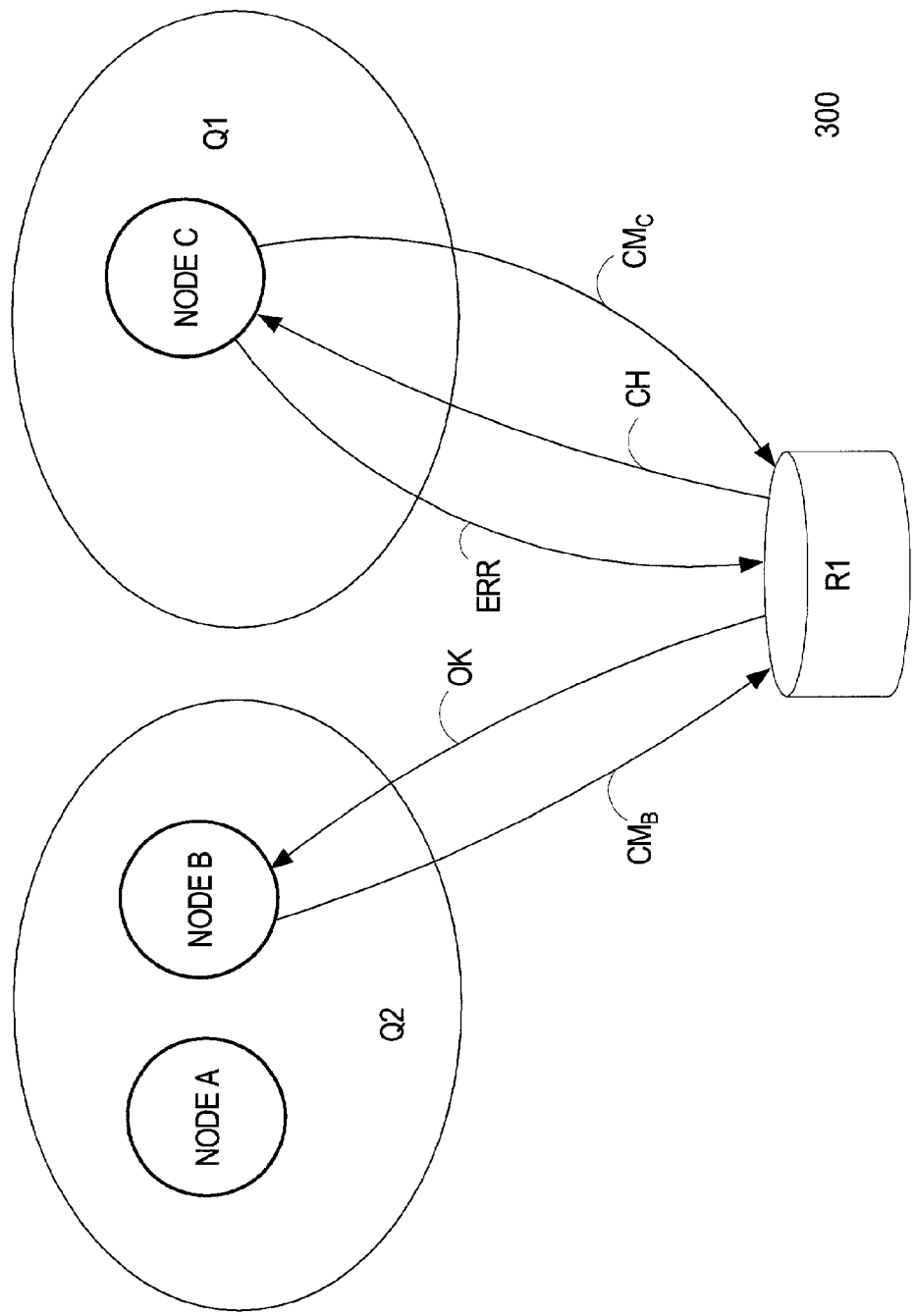
FIG. 3 is a block diagram that illustrates the condition when two quorum groups holding separate quorums, compete for the same resource provider.

FIG. 3 is a block diagram that illustrates the condition when two quorum groups holding separate quorums, compete for the same resource provider. Computer system 300 comprises node A and node B, which form a quorum group holding a quorum identified by quorum generation number Q2, and node C is another quorum group holding a quorum identified by quorum generation number Q1. Node A, node B and node C are communicatively coupled to resource provider R1. Assume that quorum generation number Q2 is greater than quorum generation number Q1 (i.e., Q2 represents a time that is more recent than the time represented by Q1).

For the purpose of illustration, the condition when two quorum groups, holding separate quorums, compete for the same resource provider may be described by the following phases in conjunction with FIG. 3:

Phase 1: At time t1, node B, on behalf of the QGS of the quorum group that holds a quorum identified by quorum generation number Q2, sends a service-command $CM_B$ to resource provider R1. Service-command $CM_B$ is "Deny (node C), Q2".

Phase 2: At time t2, assume that resource provider R1 has no reason to suspect the validity of the quorum of node B's quorum group. Thus, resource provider R1 sends to node B a service-command OK to confirm that node B's service-command $CM_B$ is accepted.

Phase 3: At time t3, node C, on behalf of the QGS of the quorum group that holds a quorum identified by quorum generation number Q1, sends a service-command $CM_C$ to resource provider R1. Service-command $CM_C$ is "Deny (node A, node B), Q1".

Phase 4: At time t4, when resource provider R1 compares the quorum generation number Q1 that is associated with service-command $CM_C$ with the quorum generation number Q2 that is in the memory of resource provider R1 and which is associated with service-command $CM_B$, resource provide R1 determines that Q2 is greater than Q1. Thus, resource provider R1 suspects the validity of the quorum of node C's quorum group and sends a challenge-command CH to node C.

Phase 5: In response to challenge-command CH, node C determines whether the quorum group of which node C is a member holds a valid quorum. If the quorum management system in computer system 300 is functioning properly, then node C will discover that the quorum of node C's quorum group has an invalid status. Assuming that the quorum management system in computer system 300 is functioning properly, node C sends a service-command ERR to resource provider R1. Service-command ERR notifies resource provider R1 to ignore node C's previous service-command $CM_C$ that was issued at time t3.

Identical Quorum Numbers

Figure 4A:
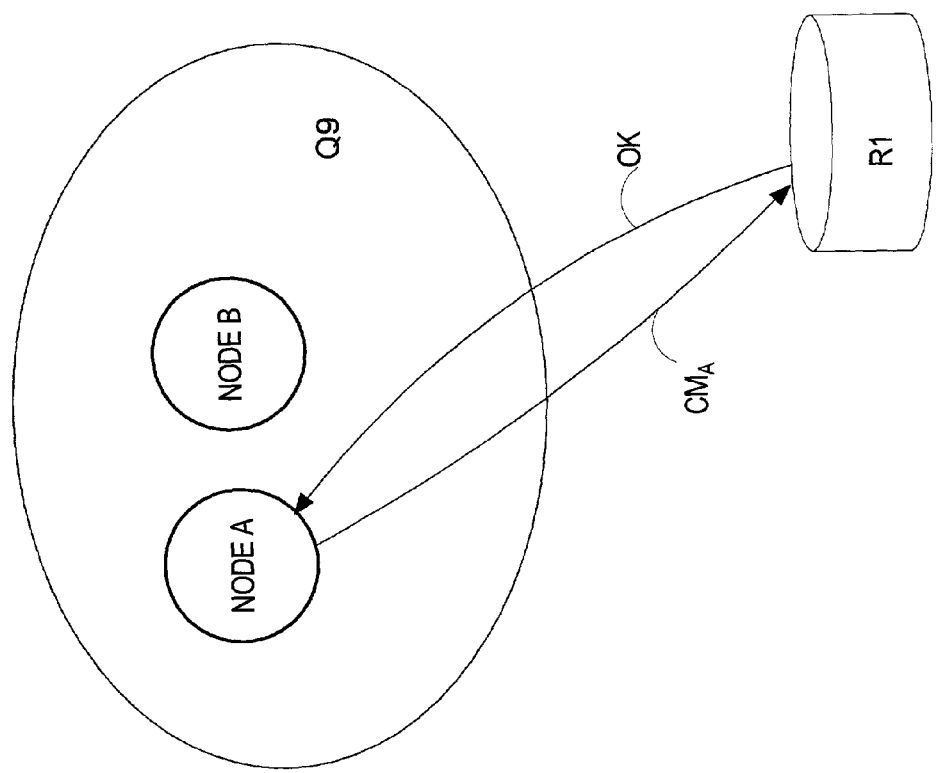
FIG. 4A and FIG. 4B are block diagrams that together illustrate the condition when two quorum generation numbers are identical.
Figure 4B:
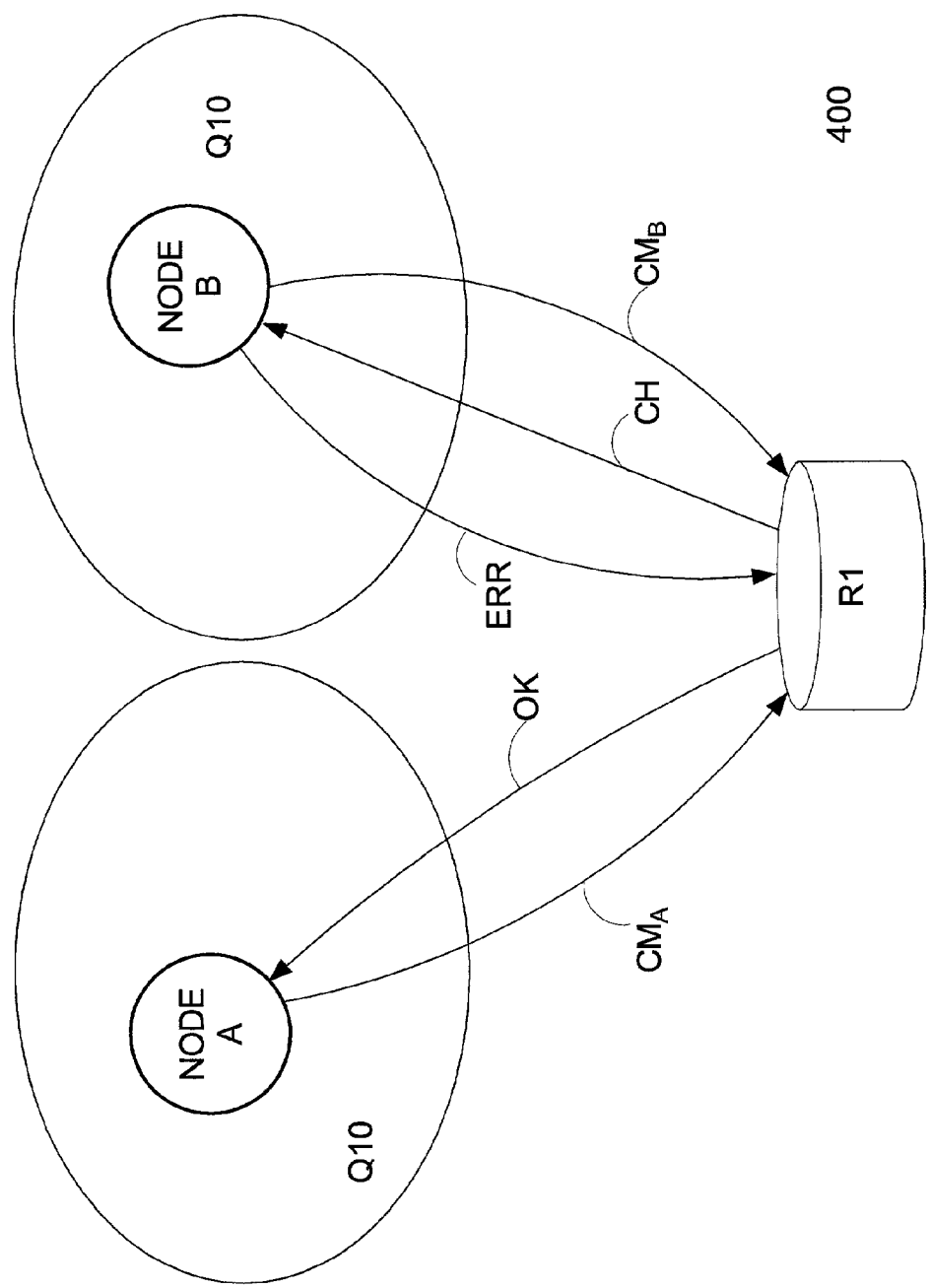

FIG. 4A and FIG. 4B are block diagrams that together illustrate the condition when two quorum generation numbers are identical. In FIG. 4A, computer system 400 comprises node A and node B that form a quorum group holding a quorum identified by quorum generation number Q9. Node A, and node B are communicatively coupled to resource provider R1.

For the purpose of illustration, the condition when two quorum groups, holding identical quorum generation numbers compete for the same resource provider may be described by the following phases in conjunction with FIG. 4A and FIG. 4B:

Phase 1: In FIG. 4A, at time t1, node A, on behalf of the QGS of the quorum group that holds a quorum identified by quorum generation number Q9, sends a service-command $CM_A$ to resource provider R1. Service-command $CM_A$ is "Allow (node A, node B), Q9".

Phase 2: At time t2, assume that resource provider R1 has no reason to suspect the validity of the quorum of node A's quorum group. Thus, resource provider R1 sends to node A a command OK to confirm that node A's service-command $CM_A$ is accepted.

Phase 3: At time t3, assume that the quorum managing function of the system malfunctions. Further assume that the malfunction destroys the QGS of FIG. 4A and that node A and node B believe that they each are in a correct cluster for forming a quorum group. In other words, each node thinks that the other node has been excluded from the cluster. Thus, each node independently forms a new quorum group that holds a quorum identified by quorum generation number Q10 as shown in FIG. 4B.

Phase 4: At time t4, node A in FIG. 4B, on behalf of node A's quorum group that holds a quorum identified by quorum generation number Q10, sends a service-command $CM_A$ to resource provider R1. Service-command $CM_A$ is "Deny (node B), Q10".

Phase 5: Assume that quorum generation number Q10 is greater than quorum generation number Q9, which is in resource provider R1's memory. Thus resource provider R1 has no reason to suspect the validity of the quorum of node A's quorum group. At time t5, resource provider R1 sends to node A a command OK to confirm that node A's service-command $CM_A$ is accepted.

Phase 6: At time t6, node B in FIG. 4B, on behalf of the node B's quorum group that holds a quorum identified by quorum generation number Q10, sends a service-command $CM_B$ to resource provider R1. Service-command $CM_B$ is "Deny (node A), Q10".

Phase 7: At time t7, when resource provider R1 compares the quorum generation number Q10 that is associated with service-command $CM_B$ with the quorum generation number Q10 that is currently in the memory of resource provider R1 and which is associated with service-command $CM_A$, resource provide R1 determines that there are two conflicting service-commands associated with the same quorum generation number. Thus, resource provider R1 suspects the validity of the quorum of node B's quorum group and sends a challenge-command CH to node B. In certain embodiments of the invention R1 may deny all subsequent service commands bearing the same quorum generation number when the command does not duplicate the original command.

Phase 8: In those embodiments of the invention in which multiple distinct service commands bearing the same quorum generation number are accepted, at time t8, in response to challenge-command CH, node B determines whether the quorum group of which node B is a member holds a valid quorum. If computer system 400 has sufficient mechanisms in place to check for errors in quorum management, then node B may discover, despite the malfunctioning quorum manager, that node B's quorum group has an invalid quorum. Assuming that there are sufficient mechanisms in place to check for errors in quorum management in computer system 400, node B sends a service-command ERR to resource provider R1. Service-command ERR notifies resource provider R1 to ignore node B's previous service-command $CM_B$ that was issued at time t6. On the other hand, if there insufficient mechanisms in computer system 400 to check for errors in quorum management, then node B may send a service-command to resource provider R1 in an attempt to insist on the validity of the quorum of node B's quorum group. At this point, resource provider R1 is forced to accept node B's original service-command $CM_B$ that was issued at time t6. Computer system 400 is likely to fail shortly thereafter due to the existence of multiple quorum groups with identical quorum generation numbers.

Hardware Overview

Figure 5:
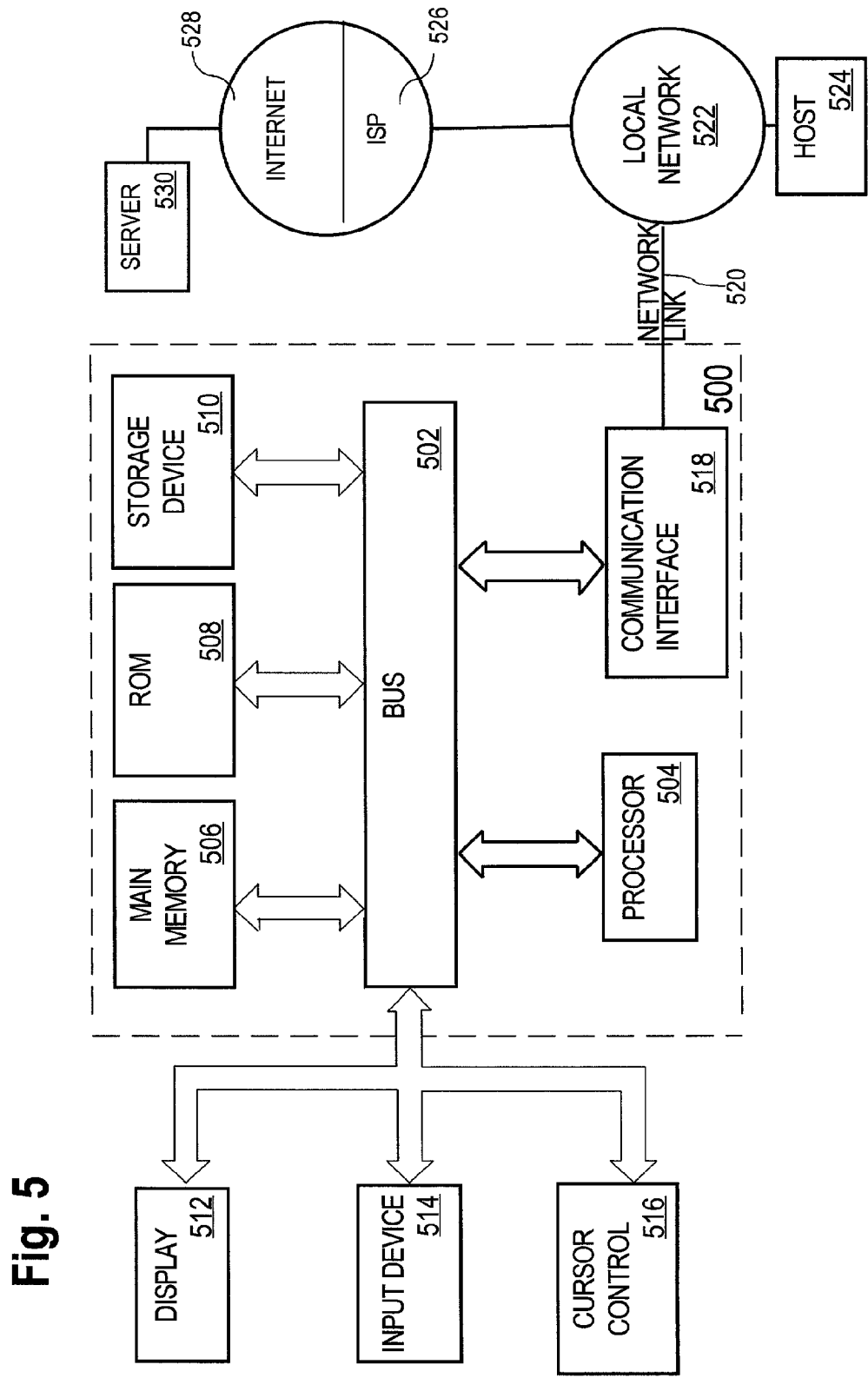
FIG. 5 is a block diagram illustrating a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are implemented by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application implements the techniques described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing access to a resource that is shared by a cluster of nodes that supports multiple types of access rights to the resource, the method comprising the computer-implemented steps of:
   receiving from a node that belongs to a quorum group of nodes within the cluster of nodes, a command that
   (a) identifies one or more specific nodes, and
   (b) expressly indicates which type of the multiple types of access rights to the resource is to be granted to the one or more specific nodes,
   wherein the quorum group includes nodes that participated in a quorum at which the nodes agreed to collectively manage access to one or more resources; and
   in response to receiving the command, and prior to enforcing the access rights that are specified in the command, performing the steps of:
      determining whether to require verification that the quorum group is a valid quorum group that is currently authorized within the cluster to specify access rights to the resource; and
      if verification is required, then (a) sending, to a verifying node in the cluster of nodes, a request to confirm that the quorum group is a valid quorum group, and (b) receiving, from the verifying node, a response that indicates whether the quorum group is valid;
   wherein the steps of the method are performed by one or more computing devices.

2. The method of claim 1, wherein the verifying node is the node that specifies access rights to the resource.

3. The method of claim 1 further comprising the step of if the quorum group is not the valid quorum group in the cluster currently authorized to specify access rights to the resource, then not enforcing the access rights specified in the command.

4. The method of claim 1 wherein the step of determining whether to require verification is performed by an agent of the resource.

5. The method of claim 1, wherein the quorum group is associated with a quorum generation number that is tagged to the command.

6. The method of claim 1, wherein the step of determining whether to require verification includes determining whether there is no previously-received command against which the command can be evaluated.

7. The method of claim 1, wherein the step of determining whether to require verification includes determining whether a quorum generation number that is associated with the command is less than another quorum generation number that is associated with a previously-received command.

8. The method of claim 1, wherein the step of determining whether to require verification includes determining whether a quorum generation number that is associated with the command has the same value as another quorum generation number that is associated with a previously-received command from a node that does not belong to the quorum group.

9. The method of claim 1 further comprising the step of determining whether the quorum group is valid in response to receiving the request to confirm that the quorum group is a valid quorum group.

10. The method of claim 1 further comprising the step of sending a confirmation of a valid status of the quorum group if it is determined that the quorum group is valid in response to receiving the request to confirm that the quorum group is a valid quorum group.

11. The method of claim 1 further comprising the step of sending an error status if it is determined that the quorum group is not valid in response to receiving the request to confirm that the quorum group is a valid quorum group.

12. The method of claim 1 further comprising the step of enforcing the command in response to receiving a confirmation of a valid status of the quorum group.

13. The method of claim 1 further comprising the step of not enforcing the command in response to receiving an error status of the quorum group.

14. The method of claim 1, wherein the multiple types of access rights to the resource supported by the cluster of nodes comprise read access, allow access, and deny access.

15. The method of claim 1, wherein the one or more specific nodes identified in the command do not include all nodes that belong to the quorum group of nodes.

16. A computer-readable non-transitory volatile or non-volatile medium storing one or more sequences of instructions for managing access to a resource that is shared by a cluster of nodes that supports multiple types of access rights to the resource, wherein execution of the one or more sequences of instructions by one or more processors causes the one or more processors to perform the steps of:
   receiving from a node that belongs to a quorum group of nodes within the cluster of nodes, a command that
   (a) identifies one or more specific nodes, and
   (b) expressly indicates which type of the multiple types of access rights to the resource is to be granted to the one or more specific nodes,
   wherein the quorum group includes nodes that participated in a quorum at which the nodes agreed to collectively manage access to one or more resources; and in response to receiving the command, and prior to enforcing the access rights that are specified in the command, performing the steps of:

determining whether to require verification that the quorum group is a valid quorum group that is currently authorized within the cluster to specify access rights to the resource; and if verification is required, then (a) sending, to a verifying node in the cluster of nodes, a request to confirm that the quorum group is a valid quorum group, and (b) receiving, from the verifying node, a response that indicates whether the quorum group is valid.

17. The computer-readable non-transitory volatile or non-volatile medium of claim 16, wherein the verifying node is the node that specifies access rights to the resource.

18. The computer-readable non-transitory volatile or non-volatile medium of claim 16, wherein the one or more sequences of instructions further comprise instructions which, when executed by the one or more processors, cause the one or more processors to perform the step of if the quorum group is not the valid quorum group in the cluster currently authorized to specify access rights to the resource, then not enforcing the access rights specified in the command.

19. The computer-readable non-transitory volatile or non-volatile medium of claim 16 wherein the step of determining whether to require verification is performed by an agent of the resource.

20. The computer-readable non-transitory volatile or non-volatile medium of claim 16, wherein the quorum is associated with a quorum generation number that is tagged to the command.

21. The computer-readable non-transitory volatile or non-volatile medium of claim 16, wherein the instructions that cause the one or more processors to perform the step of determining whether to require verification include instructions which, when executed, cause the one or more processors to perform the step of determining whether there is no previously-received command against which the command can be evaluated.

22. The computer-readable non-transitory volatile or non-volatile medium of claim 16, wherein the instructions that cause the one or more processors to perform the step of determining whether to require verification include instructions which, when executed, cause the one or more processors to perform the step of determining whether a quorum generation number that is associated with the command is less than another quorum generation number that is associated with a previously-received command.

23. The computer-readable non-transitory volatile or non-volatile medium of claim 16, wherein the instructions that cause the one or more processors to perform the step of determining whether to require verification include instructions which, when executed, cause the one or more processors to perform the step of determining whether a quorum generation number that is associated with the command has the same value as another quorum generation number that is associated with a previously-received command from a node that does not belong to the quorum group.

24. The computer-readable non-transitory volatile or non-volatile medium of claim 16, wherein the one or more sequences of instructions further comprise instructions which, when executed by the one or more processors, cause the one or more processors to perform the step of determining whether the quorum group is valid in response to receiving the request to confirm that the quorum group is a valid quorum group.

25. The computer-readable non-transitory volatile or non-volatile medium of claim 16, wherein the one or more sequences of instructions further comprise instructions which, when executed by the one or more processors, cause the one or more processors to perform the step of sending a confirmation of a valid status of the quorum group if it is determined that the quorum group is valid in response to receiving the request to confirm that the quorum group is a valid quorum group.

26. The computer-readable non-transitory volatile or non-volatile medium of claim 16, wherein the one or more sequences of instructions further comprise instructions which, when executed by the one or more processors, cause the one or more processors to perform the step of sending an error status if it is determined that the quorum group is not valid in response to receiving the request to confirm that the quorum group is a valid quorum group.

27. The computer-readable non-transitory volatile or non-volatile medium of claim 16, wherein the one or more sequences of instructions further comprise instructions which, when executed by the one or more processors, cause the one or more processors to perform the step of enforcing the command in response to receiving a confirmation of a valid status of the quorum group.

28. The computer-readable non-transitory volatile or non-volatile medium of claim 16, wherein the one or more sequences of instructions further comprise instructions which, when executed by the one or more processors, cause the one or more processors to perform the step of not enforcing the command in response to receiving an error status of the quorum group.

29. The computer-readable non-transitory volatile or non-volatile medium of claim 16, wherein the multiple types of access rights to the resource supported by the cluster of nodes comprise read access, allow access, and deny access.

30. The computer-readable non-transitory volatile or non-volatile medium of claim 16, wherein the one or more specific nodes identified in the command do not include all nodes that belong to the quorum group of nodes.

* * * * *